United States Patent [19]

Suzuki

[11] Patent Number: 4,734,800
[45] Date of Patent: Mar. 29, 1988

[54] CHANGEOVER MECHANISM FOR SELECTIVELY DRIVING TAPE LOADING AND CASSETTE LOADING IN A TAPE RECORDER

[75] Inventor: Shoji Suzuki, Iwaki, Japan

[73] Assignee: Alpine Electronics Inc., Japan

[21] Appl. No.: 845,593

[22] Filed: Mar. 28, 1986

[30] Foreign Application Priority Data

Mar. 28, 1985 [JP] Japan .................. 60-43993[U]

[51] Int. Cl.[4] .............. G11B 15/665; G11B 15/675; G11B 5/008; G11B 15/18
[52] U.S. Cl. ........................... 360/85; 360/71; 360/95; 360/96.5
[58] Field of Search ............... 360/85, 93, 95, 96.1, 360/96.5, 96.6, 71, 90, 137, 74.1, 130.21, 130.23; 242/198; 369/77.2

[56] References Cited

U.S. PATENT DOCUMENTS

| | | | |
|---|---|---|---|
| 3,947,884 | 3/1976 | Yokota et al. | 360/96.5 |
| 3,964,096 | 6/1976 | Matsuyama | 360/85 |
| 4,295,169 | 10/1981 | Iwata et al. | 360/71 |
| 4,586,096 | 4/1986 | Okada | 360/96.5 |
| 4,602,361 | 7/1986 | Kumaki et al. | 369/77.2 |
| 4,611,251 | 9/1986 | Yokoo | 360/85 |

Primary Examiner—Stuart N. Hecker
Assistant Examiner—Benjamin E. Urcia
Attorney, Agent, or Firm—Guy W. Shoup

[57] ABSTRACT

A changeover mechanism switches the power transmission path from a single reversible motor between parts performing a cassette and tape loading function and parts performing a tape unloading and cassette ejecting function in a cassette tape recorder. The changeover mechanism has a pivotable arm supporting a drive pinion, and the free end of the arm is connected to a shiftable reversing lever through a torsion spring which is arranged to bias the pivotable lever in a bistable manner so that it is moved positively in one direction and then the other, to mesh the pinion with a positive motion cam for unloading the tape and then with a cassette driving gear for ejecting the tape cassette to an unloading position.

1 Claim, 17 Drawing Figures

CHANGEOVER MECHANISM FOR SELECTIVELY DRIVING TAPE LOADING AND CASSETTE LOADING IN A TAPE RECORDER

BACKGROUND OF THE INVENTION

1. Field of the Invention

The present invention relates to a cassette tape recorder which has a motive power transmission switching mechanism for performing all the operations of mounting a tape cassette onto a feeder reel shaft and a take-up reel shaft, loading the mounted cassette tape, unloading the cassette tape, and ejecting the tape cassette, by means of a single reversible motor.

2. Description of the Prior Art

For performing the recording/reproducing operation by a cassette type video tape recorder (hereinafter abbreviated to "VTR"), it is necessary to mount a tape cassette onto a feeder reel shaft and a takeup reel shaft and thence perform loading of the mounted cassette tape to bring it into contact with a rotary head drum.

As to the above operation, conventionally, the operation of loading the cassette tape was performed by a loading motor and the operation of mounting the tape cassette was performed manually. In the case where the tape cassette was manually mounted, however, there was a disadvantage that there often occurred an error that the top side or the front side of the tape cassette was mistaken for the bottom side or the rear side of the same respectively so as to cause cutting off of the cassette tape or tangling of the tape about parts of the VTR. To avoid such a problem, there has been proposed an arrangement in which after a tape cassette has been inserted into a cassette holder the mounting of the tape cassette is automatically performed through the displacement of the cassette holder. The ejecting of the tape cassette is also performed by the displacement of the cassette holder.

In the VTR having such an arrangement as described above in which the operation of mounting/ejecting the tape cassette is performed by the displacement of the cassette holder, however, it is required to provide a reversible motor for the movement of the cassette holder separately from a tape loading motor. Since the VTR has two separate motors, that is a tape loading motor and a motor for the movement of the cassette holder, it is necessary to control the operations of these motors so that the loading is performed in time and thence it is required to provide a control section for performing the foregoing control on the two motors. These disadvantages make the prior art type VTR large in size and high in cost.

SUMMARY OF THE INVENTION

It is therefore an object of the present invention to eliminate the above-mentioned disadvantages in the prior art cassette type tape recorder.

It is another object of the invention to provide a cassette type tape recorder which is reduced in size, in weight, as well as in cost.

It is a further object of the present invention to provide a cassette type tape recorder in which all the operations of mounting/ejecting a tape cassette, and loading/unloading the cassette tape are performed by a single motor.

It is also an object of the invention to provide a cassette type tape recorder having motive power transmission passage change-over mechanism for changing-over motive power from a single motor between a tape loading mechanism and to a cassette holder moving mechanism.

To attain the foregoing objects, according to an aspect of the invention, the cassette type tape recorder is featured in that a pinion is rotatably supported on a portion of a rotary arm rotatably supported at its base portion on a chassis, the pinion pinion being positioned between a first loading gear and a first cassette holder moving gear so that the pinion engages with selected one of the first loading gear and the first cassette holder moving gear owing to the rotation of the pinion in response to the rotation of the rotary arm, and that there are provided a change-over means for selectively causing the rotary arm to rotate so that the pinion engages with selected one of the first loading gear and the first cassette holder moving gear, and a motive power means for rotating the pinion selectively in one of opposite rotational directions.

Preferably, the change-over means is arranged such that a spring is provided between the rotary arm and a reversible lever rotatably supported on the chassis and that a support point of the spring on the part of the reversible lever can be positioned at selected one of sides separated by a line passing a rotary axis of the rotary arm and a support point of the spring on the part of the rotary arm, the reversible lever being interlinked with operations of mechanical elements constituting a cassette holder moving mechanism and a tape loading mechanism.

DETAILED DESCRIPTION OF PREFERRED EMBODIMENTS

Figure 1:
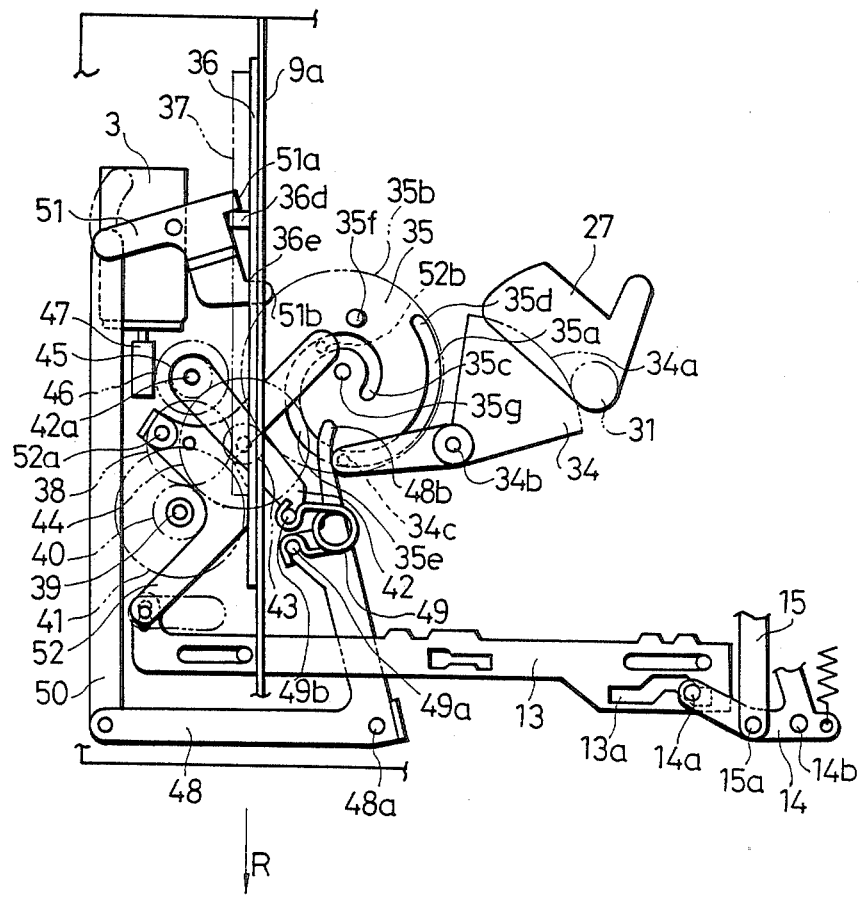
FIG. 1 is a schematical plan view of important parts of a cassette type tape recorder according to the present invention.

Preferred embodiments of the present invention will be described in detail hereunder with reference to the drawing.

Figure 11:
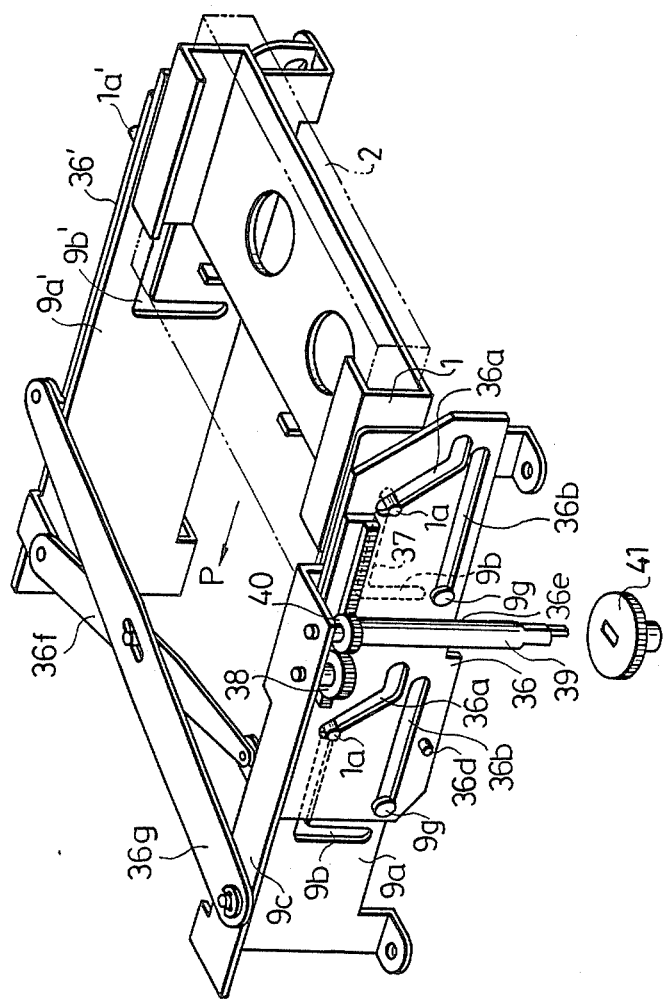
FIG. 11 is a view for explaining the movement of a cassette holder.
Figure 12:
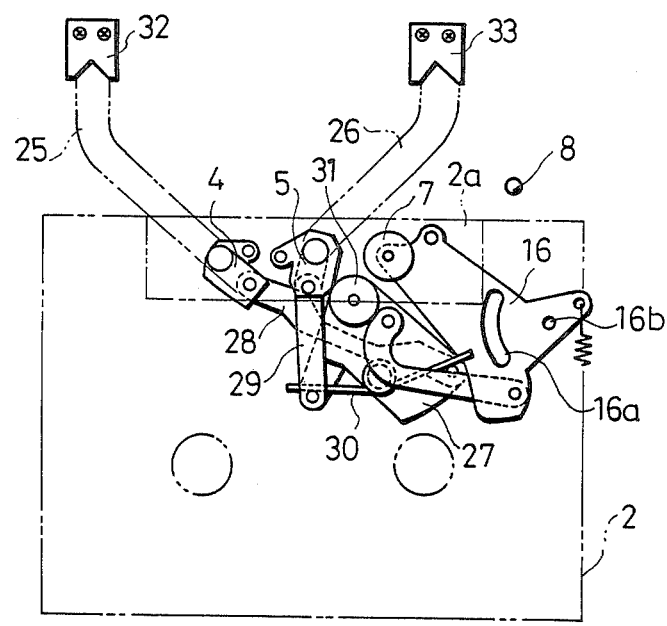
FIGS. 12 and 13 are views for explaining the condition of loading.
Figure 13:
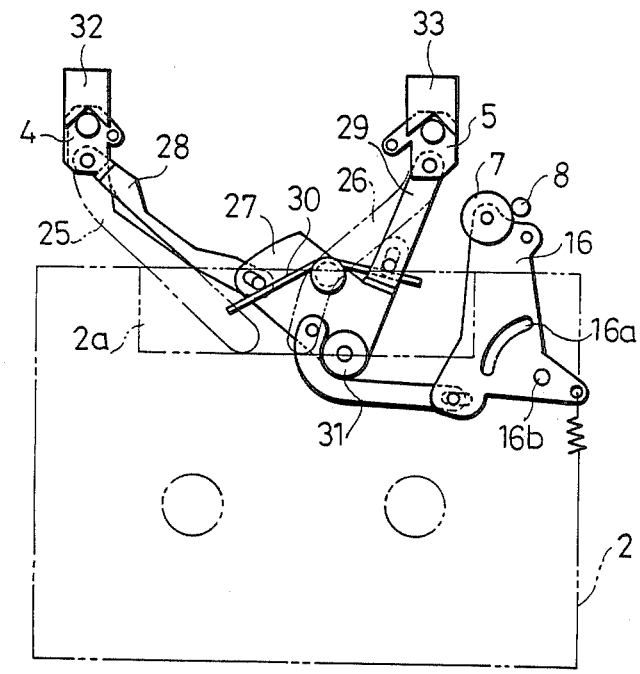

Referring first to FIGS. 11 through 13, loading will be described in connection with the movement of a cassette holder 1. When a tape cassette 2 is inserted into the cassette holder 1 and an operation button ( not shown ) is operated, a reversible motor 3 ( see FIG. 1 ) is started so that the cassette holder 1 is moved horizontally in the direction of the arrow P in FIG. 11 to a suitable position and thence moved vertically downward, so that in the cassette tape case 2 is mounted. Loading blocks 4 and 5 disposed at an opening portion 2a of the cassette tape case 2 as shown in FIG. 12 are moved upward in FIG. 12 by the continuous rotation of the reversible motor 3 and go out of the opening portion 2a of the cassette tape case 2 so that the blocks 4 and 5 draw out the tape 6 ( see FIG. 2 ) to perform loading. Thereafter a pinch roller 7 ( see FIG. 2) moves to cause the tape 6 to be in contact with a capstan 8 ( see FIG. 2 ) so that the VTR becomes standing by or ready to perform recording/reproducing.

An outline of the operation has been thus described, and the arrangement and the operation will be described in detail hereunder.

Figure 2:
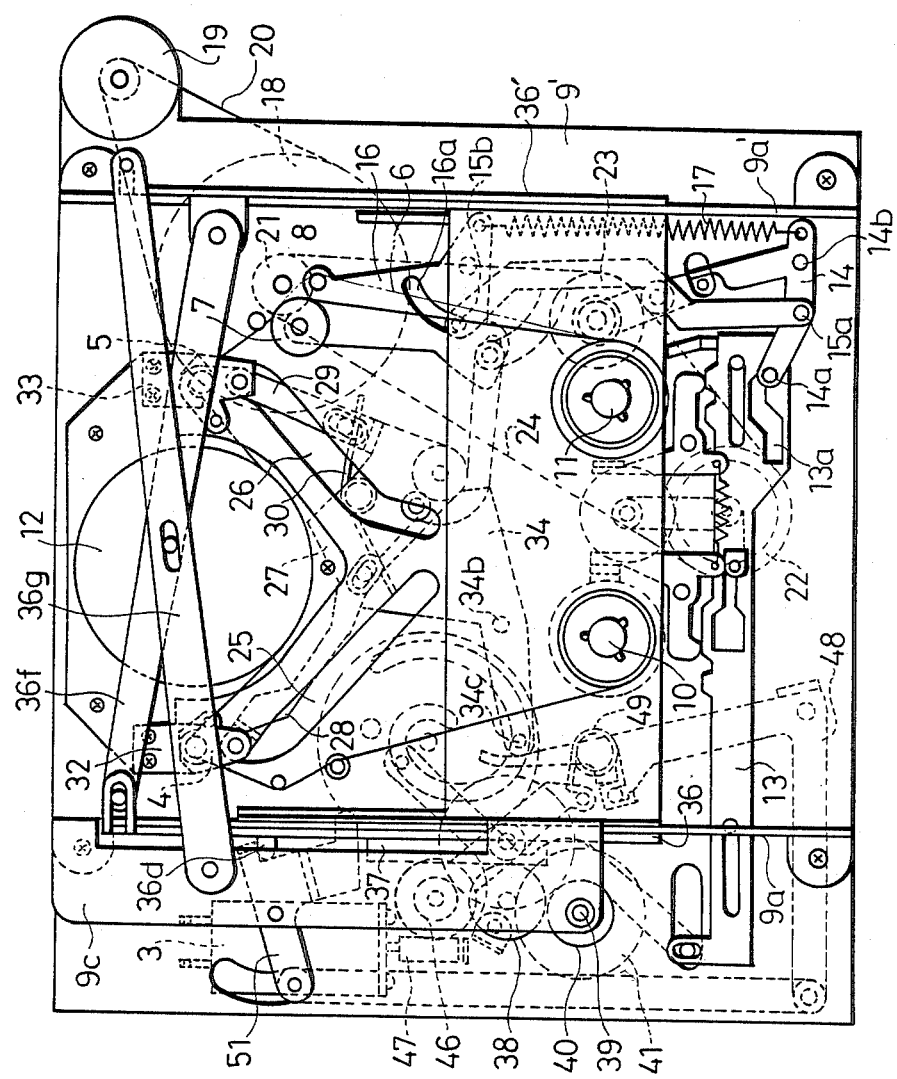
FIG. 2 is a plan view of internal parts of the same tape recorder, shown by broken lines.
Figure 3:
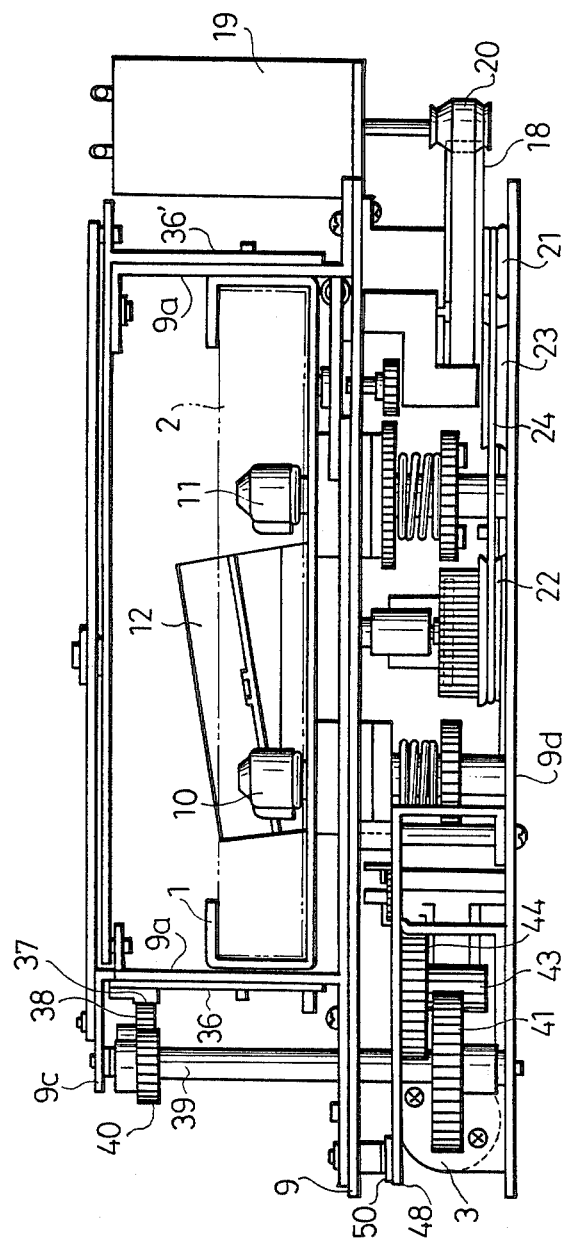
FIG. 3 is a front view of the same tape recorder.
Figure 4:
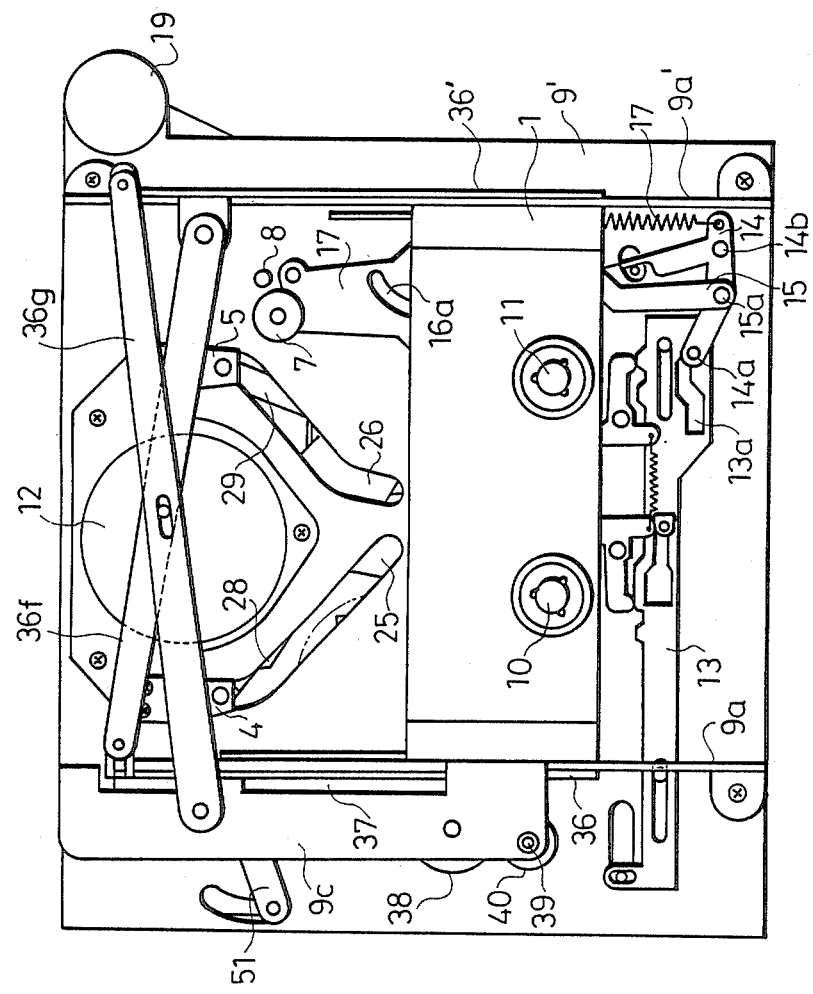
FIG. 4 is a plan view of the same tape recorder.
Figure 5:
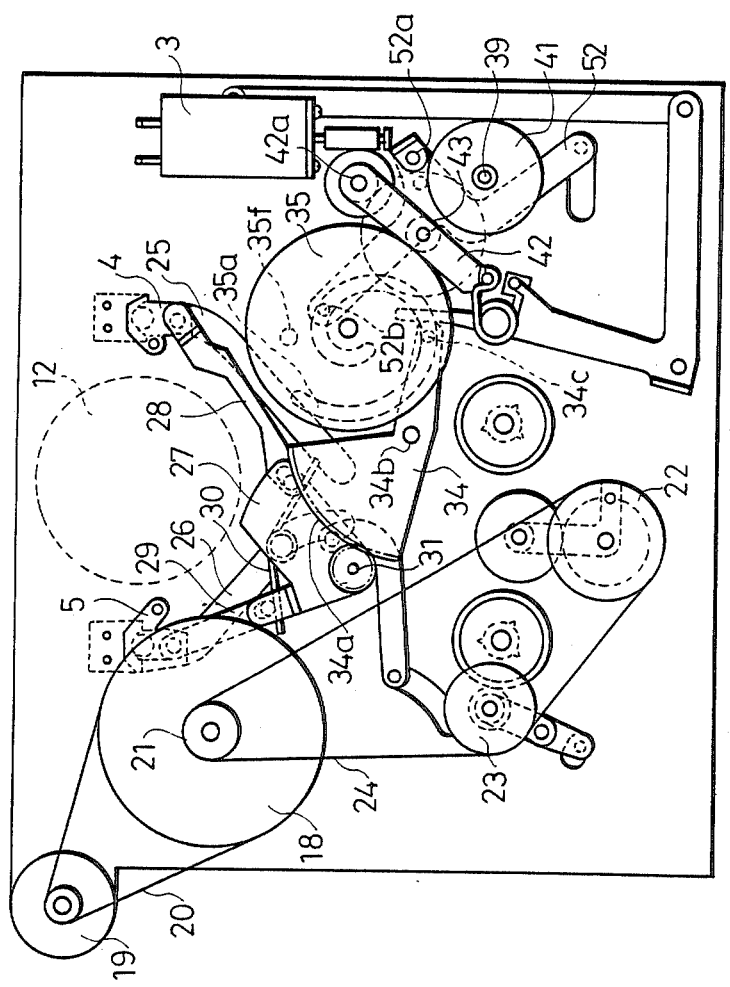
FIG. 5 is a bottom view of the same tape recorder with the subchassis removed.
Figure 6:
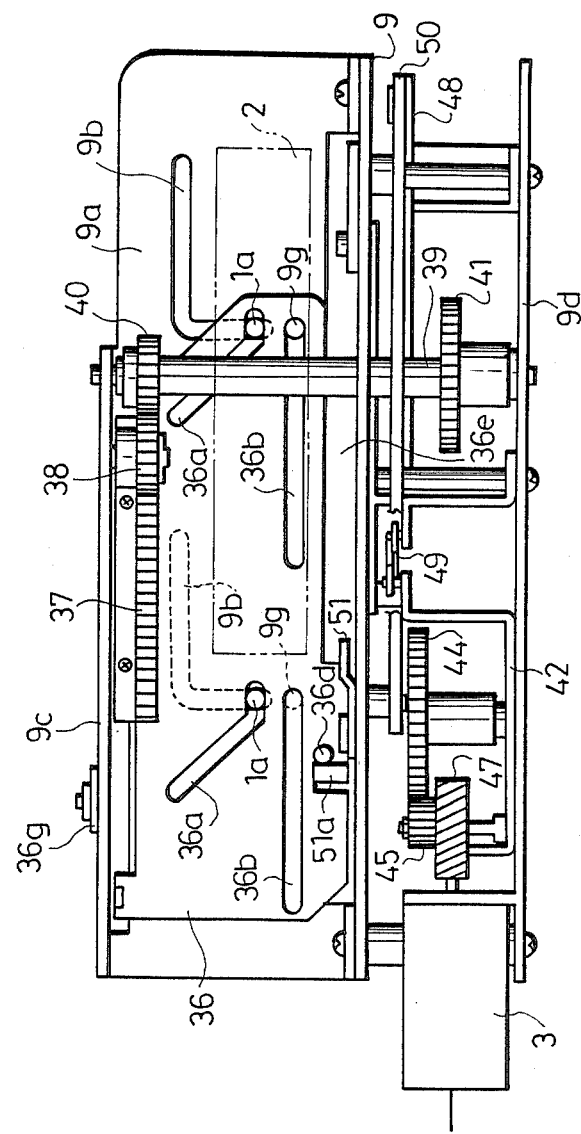
FIG. 6 is a left side view of the same tape recorder.
Figure 7:
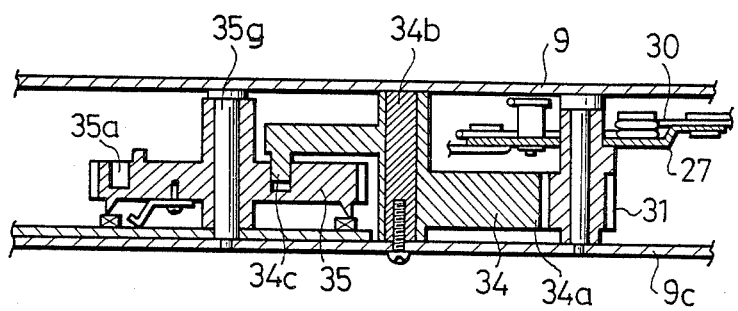
FIG. 7 is a cross-section showing the relationship between a positive motion cam and a sector gear.
Figure 8:
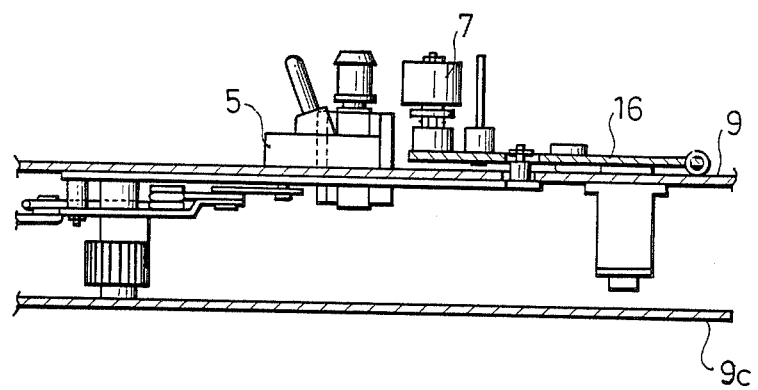
FIG. 8 is a cross-section showing the relationship between a loading arm and a pinch roller bearing plate.
Figure 9:
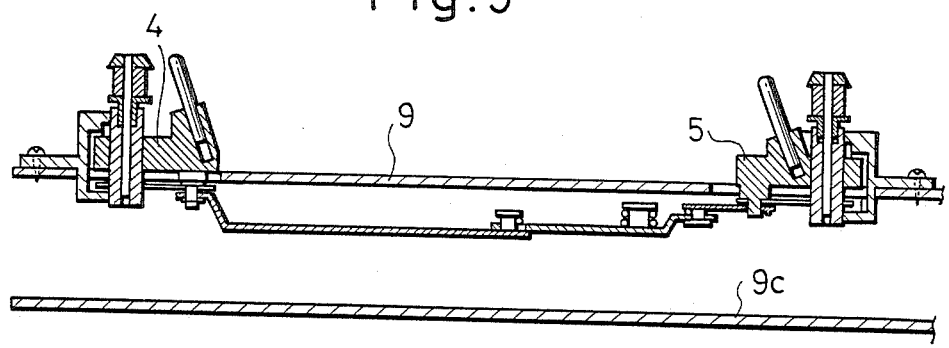
FIG. 9 is a cross-section of parts concerned with loading blocks.
Figure 10:
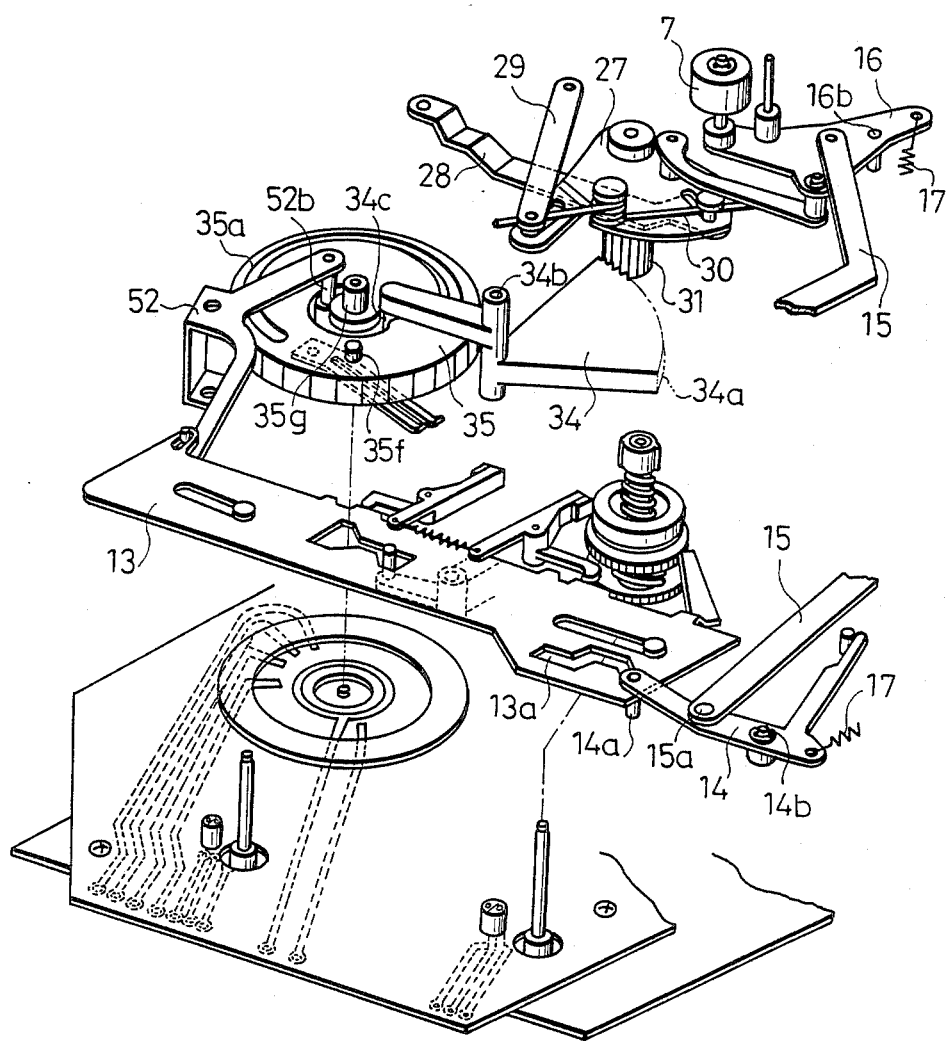
FIG. 10 is an exploded perspective view showing the arrangement of parts concerned with loading.

On a chassis 9, a supply reel shaft 10 and a take-up real shaft 11 are provided to wind the tape 6 in the tape cassette 2 which has been mounted, so that the tape 6 can be wound onto the take-up real shaft 11 from the supply real shaft 10 via the loading block 4, a rotary head drum 12, the loading block 5, the pinch roller 7, the capstan 8, etc. FIGS. 2 and 4 show a stoppage condition of the tape 6, in which the pinch roller 7 and the capstan 8 are isolated from each other.

A control plate 13 formed with a chevron-shaped through hole 13a at its end portion is provided on the chassis 9 slidably left/right in FIGS. 2 and 4. A pin 14a formed at one end portion of a lever 14 is loosely inserted in the chevron-shaped through hole 13a of the control plate 13. A connection plate 15 is rotatably supported by an axle 15a on the lever 14 at its center portion and the lever 14 is rotatably supported on the chassis 9 by an axle 14b. A pin 15b formed at a free end portion of the connection plate 15 is loosely inserted into an arc-shaped hole 16a formed in a pinch roller support plate 16. The pinch roller 7 is rotatably supported on the pinch roller support plate 16 at its one end portion and a tension spring 17 is stretched between the other end portion of the pinch roller support plate 16 and a top end portion of the lever 14. The pinch roller support plate 16 is rotatably supported by an axle 16b on the chassis 9. When the control plate 13 is slid right upward in FIGS. 1, 2, 4, 10, and 16, the pin 14a is guided along the chevron-shaped through hole 13a so that the lever 14 is rotated clockwise in the same drawings so as to urge the connection plate 15 upward in the same drawings. This urging removes the restriction on the pinch roller support plate 16 which is therefore rotated clockwise in the same drawings by the spring force of the tension spring 17 so that the tape 6 is urged against the capstan 8.

The capstan 8 is provided with a flywheel 18 fitted on the shaft of the capstan 8 and a belt 20 is entrained between a capstan motor 19 and the flywheel 18 so as to rotate the capstan 8. A belt 24 is entrained from a pulley 21 fitted on the shaft of the capstan 8 to drive pulleys 22 and 23 pivoted on the chassis 9 so as to drive the supply real shaft 10 and the take-up real shaft 11.

The loading blocks 4 and 5 are arranged to be slidable within guide holes 25 and 26 formed in the chassis 9, respectively.

The reference numeral 27 designates an arm rotatably supported on the chassis 9, the arm 27 having one end rotatably supporting an end portion of a connection arm 28 supporting the loading block 4 and the other end rotatably supporting an end portion of a connection arm 29 supporting the loading block 5. At the substantially center portion of the arm 27, provided is a torsion spring 30 the opposite ends of which are attached to the support points of the connection arms 28 and 29 respectively. A third loading gear 31 is provided integrally with the arm 27. At the top end portions of the guide holes 25 and 26, stoppers 32 and 33 are provided for the loading blocks 4 and 5, respectively.

The reference numeral 34 designates a sector gear having a second loading gear 34a which engages with the third loading gear 31. The sector gear 34 is rotatably supported at its substantially center portion by an axle 34b on the chassis 9. A pin 34c provided on the sector gear 34 at its end portion is loosely inserted into a cam slot 35c of a positive motion cam 35

The positive motion cam 35 is rotatably supported by an axle 35g on the chassis and formed with a first loading gear 35b by threading the outer circumference of the cam 35. A cam slot 35a of the positive motion cam 35 is composed of: an inner arc-shaped slot portion 35c which is formed at the inner side in the positive motion cam 35 and shaped like an arc of suitable length about the axle 35g of the positive motion cam 35; an outer arc-shaped slot portion 35d which is formed at the outer side in the positive motion cam 35 and shaped like an arc of suitable length about the axle 35g; and a connection slot portion 35e which connects the arc-shaped slot portions 35c and 35d to each other. The pin 34c of the sector gear 34 is movably loosely inserted in the cam slot 35a. The positive motion cam 35 is provided with an engagement/locking protrusion 35f.

The first loading gear 35b, the positive motion cam 35, the sector gear 34, the second loading gear 34a, the third loading gear 31, and the arm 27 constitute a motive power transmission passage for the loading operation. Another motive power tansmission passage for the movement of the cassette holder 1 will be described hereunder about its arrangement.

The cassette holder 1 is, as shown in FIG. 11, disposed between side plates 9a and 9a' rising uprightly from the chassis 9. The cassette holder 1 has two pins 1a and 1a' formed on its one side wall and one pin 1a on its other side wall, the respective pins 1a, 1a' . . . being loosely inserted into corresponding L-shaped holes 9b, 9b' . . . formed in the side plate 9a and 9a'. At the respective outer sides of the side plates 9a and 9b, slide plates 36 and 36' are disposed so as to be slidable while contacting with the side plates 9a and 9b. The pins 1a, 1a' . . . of the cassette holder 1 loosely inserted into the L-shaped holes 9b, 9b' . . . of the side plates 9a and 9a' are loosely inserted into slanting holes 36a, 36a . . . formed in the slide plates 36 and 36'. The slide plates 36 and 36' are formed with elongated through holes 36b and 36b which receive pins 9c and 9c' projectingly provided on the the side plates 9a and 9a' to slidably guide the slide plates 36 and 36. The slide plate 36 is provided with a rack 37 acting as a fourth gear for moving the cassette holder. The reference numerals 36f and 36g designate connection arms for moving the slide plates 36 and 36' in the interlocked condition. The connection arm 36f is rotatably supported at its one end on the slide plate 36 provided with the rack 37, and at its other end on the side plate 9a with which the slide plate 36' contacts slidably. The other connection arm 36g is rotatably supported at its one end on the slide plate 36' without having the rack 37, and at its other end on the side plate 9a with which the slide plate 36 contacts slidably. In order to rotatably slidably connect the connection arm 36f and 36g with each other at their substantially center portion, a pin 36h rooted on the one connection arm 36f at its substantially center portion is movably loosely inserted into an elongated hole 36i formed in the other connection arm 36g longitudinally at the substantially center portion thereof. A third cassette holder moving gear 38 engaging with the rack 37 is rotatably supported on a top plate portion 9c formed by bending the upper portion of the side plate 9a. Between the top plate portion 9c and a subchassis 9d, there is provided a counter shaft 39 passed through the chassis 9. A second cassette holder moving gear 40 engaging with the third cassette holder gear 38 is fitted on the counter shaft 39 at its upper portion. A first cassette holder moving gear 41 is fitted on the counter shaft 39 at its lower portion at the substantially same height with the first loading gear 35b of the positive motion cam 35.

The reference numeral 42 designates a rotary arm which is rotatably supported at its one end on the chassis 9, and at its substantially center portion on a pinion 43. The pinion 43 is disposed between the first loading gear 35b and the first cassette holder moving gear 41 and is turned by the rotation of the rotary arm 42 so as to engage with either the first loading gear 35b or the first cassette holder moving gear 41. A large idle gear 44 is fitted on the shaft of the pinion 43 so that the pinion 43 and the large idle gear 44 rotate in synchronism with each other. A small idle gear 45 engaged with the large idle gear 44 and a worm wheel 46 are fitted onto the rotary shaft 42a of the rotary arm 42, the worm wheel 46 being engaged with a worm 47 fitted onto the output shaft of the reversible motor 3.

Figure 14:
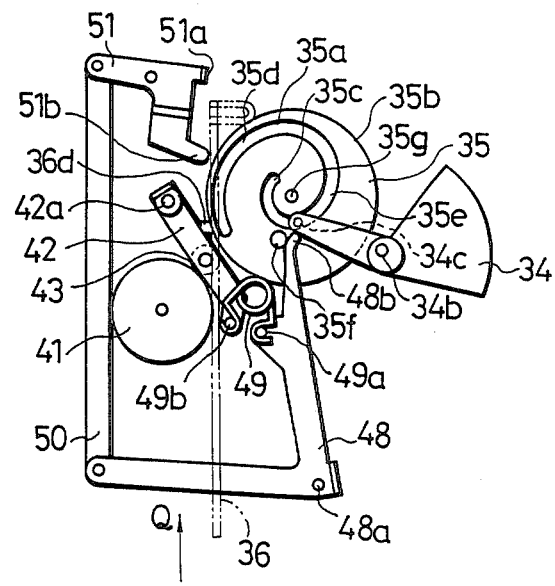
FIGS. 14 and 15 are plan views for explaining the operation of important parts.

The reference numeral 48 designates a substantially V-shaped reversible lever rotatably supported on the chassis 9, and, more particularly, supported at its V-shaped bent portion by an axle 48a onto the chassis 9. A torsion coil spring 49 is provided between a portion of the reversible lever 48 and a top end portion of the rotary arm 42 such that a supporting point 49a of the torsion spring 49 on the reversible lever 48 side can be positioned on either the first loading gear 35b side or the first cassette holder moving gear 41 side separated by a boundary passing the other supporting point 49b of the torsion spring 49 on the rotary arm 42 side and the rotary shaft 42a of the rotary arm 42. At an arm portion of the reversible lever 48 on the side where the torsion spring 49 is supported, there is formed an engagement-/locking end portion 48b engaged with the engagement/locking protrusion 35f of the positive motion cam 35 as well as the end portion of the sector gear 34 where the pin 34c is provided. During the period when the engagement/locking end portion 48b engages with the end portion of the sector gear 34 as shown in FIG. 14, the sector gear 34 is prevented from rotating.

A connection plate 50 is rotatably supported at its one end on the reversible lever 48 at the other end thereof, and an engagement/locking lever 51 is rotatably supported on the connection plate 50 at its other end. The engagement/locking lever 51 is rotatably supported on the chassis 9. The lever 51 is provided at its one end with a bent portion 51a engaging with a protrusion 36d upwardly projectingly provided on the slide plate 36, and provided at its other end with a protrusion 51b inserted into a notch portion 36e formed in the lower end edge portion of the slide plate 36.

The reference numeral 52 designates a lever rotatably supported by an axle 52a onto the chassis 9. The lever 52 is rotatably supported at its one end on the control plate 13 at an end portion thereof, and provided at its other end with a pin 52b movably loosely inserted into the cam slot 35a of the positive motion cam 35. The pin 52b and the pin 34c of the sector gear 34c have such a positional relationship therebetween that in the case where any one of the pins is positioned within the connection slot portion 35e, other pin must be disposed within either one of the arc-shaped slot portions 35c and 35d.

The operations of the thus arranged embodiment of the present invention will be described hereunder.

Before the tape cassette 2 is inserted, the cassette holder 1 is placed at the upper positions of the side plates 9a and 9a' as shown in FIG. 11 and the motive power transmission is in the condition that the pinion 43 engages with the first cassette holder moving gear 41 as shown in FIG. 14. In this case, as shown in FIG. 14, the support point 49a of the torsion spring 49 on the reversible lever 48 side is on the first loading gear 35b side with respect to the boundary passing the rotary shaft 42a of the rotary arm 42 and the support point of the torsion spring 49 on the rotary arm 42 side, and thus the pinion 43 is sure to engage with the first cassette holder moving gear 41 by the stored energy of spring force of the torsion spring 49 in the direction of spreading the same.

Under the condition, if the tape cassette 2 is inserted into the cassette holder 1 and the operation button (not shown) is operated, the reversible motor 3 rotates forward so that the large idle gear 44 is rotated through the worm 47, the worm wheel 46, and the small idle gear 45 rotating in synchronism with the worm wheel 46. Consequently, the pinion 43 coaxially provided with the large idle gear 44 rotates. In this case, the rotational direction of the pinion 43 is counterclockwise in FIG. 14 and therefore the rotation of the reversible motor rotating the pinion 43 in this direction is referred to as forward rotation.

Owing to the rotation of the pinion 43, the first cassette holder moving gear 41 engaged with the pinion 43 and the second cassette holder moving second gear 40 provided coaxially with the first cassette holder moving gear 41 are rotated clockwise, and further, the third cassette holder moving gear 38 engaged with the second cassette holder moving gear 40 is rotated counterclockwise so as to move the slide plate 36 having the rack 37 engaged with the third cassette holder moving gear 38 in the direction of an arrow in FIG. 14, so that the slide plates 36 and 36' connected to each other through the connection arms 36f and 36g are moved in the same direction. The cassette holder 1 having the pins 1a, 1a' ... movably loosely inserted into the slanting through hole 36a formed in the slide plates 36 and 36' is moved in the direction of an arrow P in FIG. 11.

In the process of movement of the cassette holder 1, the cassette holder 1 moves horizontally in the direction of the arrow P in FIG. 11 as described above as long as the pins 1a, 1a' ... are placed at horizontal portions of the L-shaped holes 9b, 9b' ... formed in the side plates 9a and 9a', whereas the cassette holder 1 moves vertically downward when the pins 1a, 1a' ... are placed at vertical portions of the L-shaped holes 9a, 9a' ... and move downward along those vertical portions while coming down within the slanting holes 36a, 36a. ...

Owing to the vertical movement, the tape cassette 2 is fitted onto the supply real shaft 10 and the take-up real shaft 11 and the movement of the slide plates 36 and 36' is terminated.

Substantially at the same time as the termination of the movement of the slide plate 36, the protrusion 36d projectingly provided on the slide plate 36 engages with the bent portion 51a of the engagement/locking lever 51 so that the engagement/locking lever 51 is rotated counterclockwise in FIG. 14, and on the other hand, the protrusion 51b disposed in the notch portion 36e of the slide plate 36 prevents the slide plate 36 from moving opposite to the direction of the arrow Q in FIG. 14. Owing to this rotation, the connection plate 50 is moved opposite to the direction of the arrow Q of FIG. 14 so that the reversible lever 48 rotates counterclockwise in FIG. 14. Owing to the rotation of the reversible lever 48, the support point 49a of the torsion coil spring 49 on the reversible lever 48 side is positioned at the first cassette holder moving gear 41 side with respect to the boundary passing the rotary shaft 42a of the the rotary arm 42 and the support point 49b of the torsion spring 49 on the rotary arm 42 side, so that the pinion 43 engages with the first loading gear 35b as shown in FIG. 15 by the stored spring force in the torsion coil spring 49 in the direction of spreading the same.

As the pinion 43 rotates counterclockwise as described above, the positive motion cam 35 provided with the first loading gear 35b engaging with the pinion 43 rotates clockwise. If the reversible lever 48 does not rotate counterclockwise as described above, however, the positive motion cam 35 does not rotate since the engagement/locking end portion 48b of the reversible lever 48 engages with the end portion of the sector gear 34 and the pin 34c provided on the end portion sector gear 34 is inseritied into the cam slot 35a. When the reversible lever 48 rotates countercloskwise as described above and the pinion 43 engages with the first loading gear 35b, the positive motion cam 35 rotates clockwise in FIG. 14 so that the pin 34c of the sector gear 34 placed in the connection slot portion 35e of the cam slot 35a is guided by the connection slot portion 35e and turned counterclockwise around the axle 34b of the sector gear 34 to thereby cause the sector gear 34 to rotate counterclockwise to come to such a position as shown in FIG. 15. Owing to the rotation of the sector gear 34, the arm 27 provided with the third loading gear 31 engaging with the second loading gear 34a of the sector gear 34 is rotated clockwise in FIG. 12 so as to urge the connection arms 28 and 29 through the torsion spring 30. The loading blocks 4 and 5 supported on the connection arms 28 and 29 are guided by the guide holes 25 and 26 to move upward in FIG. 12 to abut against the stoppers 32 and 33, and urged by the stoppers 32 and 33 owing to the stored force of the torsion spring 30 to thereby perform the loading of the tape 6.

Figure 15:
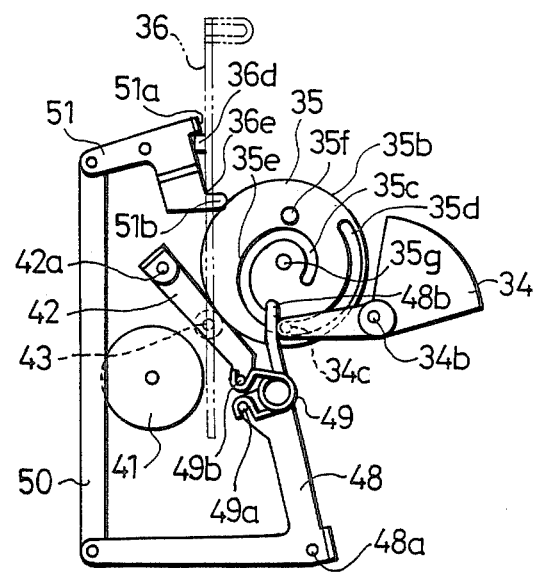
Figure 16:
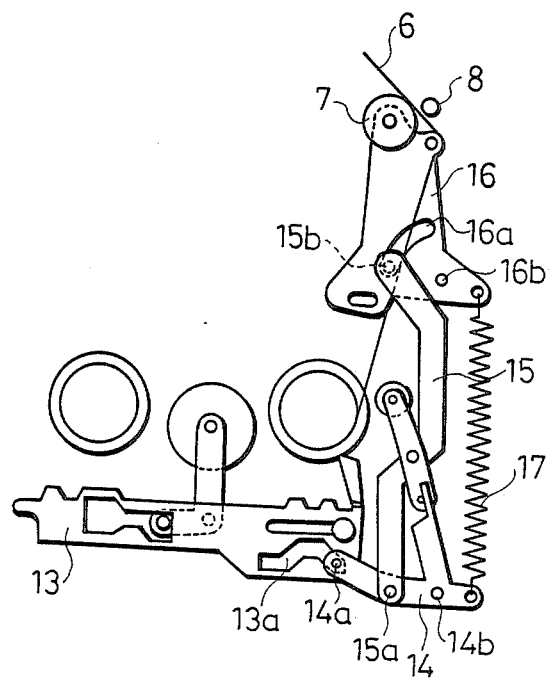
FIGS. 16 and 17 are plan views for explaining the relationship between a pinch roller and a capstan.
Figure 17:
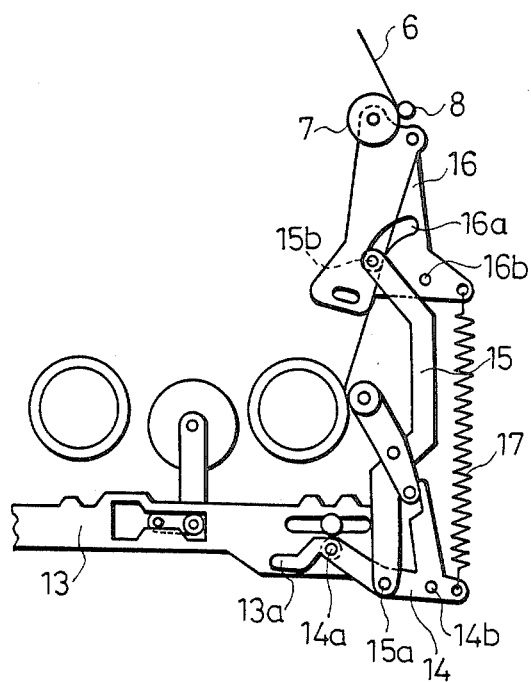

FIGS. 1, 2 and 15 show the positional relationship of the various parts when the loading of the the tape 6 is finished. The positive motion cam 35 is further rotated clockwise by the pinion 43. Owing to the rotation of the positive motion cam 35, the pin 52b of the lever 52 within the connection slot portion 35e of the cam slot 35a is guided by the connection slot portion 35e around the rotary shaft 52a of the lever 52 and turned counterclockwise in FIG. 1 so that the lever 52 rotates counterclockwise in FIG. 1. Owing to this rotation, the control plate 13 rotatably supported on the lever 52 moves right upward in FIG. 1 so that the pinch roller 7 abuts against the capstan 8 as described above. Thereafter the reversible motor is stopped from rotating.

Since the pin 34c of the sector gear 34 is placed in the outer arc-shaped slot portion 35d of the cam slot 35a, the sector gear does not rotate. On the other hand, as the pin 34c of the sector gear 34 is disposed in the connection slot portion 35e during the rotation of the sector gear 34,, the pin 52b of the lever 52 disposed in the inner arc-shaped slot portion 35c does not rotate. In short, before the cassette tape case 2 is inserted, the pin 34c of the sector gear 34 is positioned nearly at the joint portion between the inner arc-shaped slot portion 35c and the connection slot portion 35e of the cam slot 35a while the pin 52b of the lever 52 is positioned nearly at the end portion of the inner arc-shaped slot portion 35c of the cam slot 35a. In operation of recording/reproducing the tape 6, the pin 34c is positied nearly at the end portion of the outer arc-shaped slot portion 35d of the cam slot 35a while the pin 52b is positioned nearly at the joint portion between the outer arc-shaped slot portion 35d and the connection slot portion 35e.

When an ejection button ( not shown ) is operated, the reversible motor 3 rotates reversely to perform the operations of unloading the tape 6 and ejecting the tape cassette 2. Owing to the reversal rotation of the reversible motor 3 the pinion 43 is rotated clockwise. In responce to the rotation of the pinion 43, the positive motion cam 35 is rotated counterclockwise in FIG. 1 so that the control plate 13 which has been moved to the right end moves left to the position shown in FIG. 1 to thereby separate the pinch roller 7 from the capstan 8. Next, the sector gear 34 rotates clockwise in FIG. 1 so that the arm 27 is rotated counterclockwise to unload the tape. When the operation of unloading the tape 6 is finished, the engagement/locking protrusion 35f of the positive motion cam 35 presses the engagement/locking end portion 48b of the reversible lever 48 to thereby rotate the reversible lever 48 clockwise in FIG. 1. At this time, the end portion of the sector gear 34 has been evacuated from the rotation area of the reversible lever 48. Owing to the rotation of the reversible lever 48, the support point 49a is positioned on the positive motion cam 35 side with respect to the boundary passing the rotary shaft 42a of the rotary arm 42 and the support point 49b, so that the pinion 43 engages with the first cassette holder moving gear 412 by the stored spring force of the torsion spring 49 in the direction of spreading the same. In response to the rotation of the reversible lever 48, the engagement/locking lever 51 is rotated clockwise in FIG. 1 through the connection plate 50, so that the protrusion 51b of the engagement/locking lever 51 is evacuated from the notch portion 36e of the slide plate 36 which is thus made movable. Thereafter, the third cassette holder moving gear 38 is rotated clockwise owing to the clockwise rotation of the pinion 43, the slide plate 36 having the rack 37 is moved in the direction of an arrow R in FIG. 1, the cassette holder 1 is moved horizontally and vertically in the manner reversed to the above case, and thus the tape cassette is ejected.

As described above, according to the present invention, the cassette type tape recorder is arranged such that a pinion is rotatably supported on a portion of a rotary arm rotatably supported at its base portion on a chassis, the pinion being positioned between a first loading gear and a first cassette holder so that the pinion engages with selected one of the first loading gear and the first cassette holder moving gear owing to the rotation of the pinion in response to the rotation of the rotary arm, and such that there are provided a change-over means for selectively causing the rotary arm to rotate so that the pinion engages with selected one of the first loading gear and the first cassette holder moving gear, and a motive power means for rotating the pinion selectively in one of opposite rotational directions, resulting in the following advantages.

If a tape cassette is inserted into the VTR and an operation button is operated in order to perform recording/reproducing of a cassette tape, the cassette holder is actuated to operate to mount the tape cassette in position and then the motive power transmission is changed over by the change-over means so as to perform tape loading. Thus, the loading operation can be successively continuously performed. Since the cassette type tape recorder is arranged such that the movement of the cassette holder and the loading operation can be performed by a single motive power means, the reduction can be realized not only in size and in weight, but in cost.

Further, preferably, the change-over means is arranged such that a spring is provided between the rotary arm and a reversible lever rotatably supported on the chassis and that a support point of the spring on the part of the reversible lever can be positioned at selected one of sides separated by a line passing a rotary axis of the rotary arm and a support point of the spring on the part of the rotary arm, the reversible lever being interlinked with operations of mechanical elements constituting a cassette moving mechanism and a tape loading mechanism, whereby the tape recorder can be extremely simplified and it is made possible to provide the cassette type tape recorder inexpensively.

What is claimed is:

1. A changeover mechanism for selectively driving tape loading and cassette loading in a cassette tape recorder having a chassis, a single reversible motor in the chassis providing a power output in a forward direction for driving a cassette moving mechanism to move a tape cassette inserted in the chassis to a loading position and driving a tape loading mechanism to load a tape in the cassette around a recorder head, and in a reverse direction to unload the tape from the recorder head and eject the tape cassette from the chassis, said changeover mechanism comprising:

a rotatable cassette moving gear (41) in mesh with a cassette moving mechanism for moving the inserted cassette to a loading position when said cassette moving gear is rotated in a forward direction, and for moving the cassette from the loading position to an ejection position when said gear is rotated in a reverse direction;

a rotatable positive motion cam (35) having a spiral groove formed therein, said groove extending between an outer (35d) position and an inner (35c) position, in which one end of a pivotable sector gear (34) is slidably retained for pivoting the sector gear correspondingly in response to rotation of the positive motion cam in forward and reverse directions, said sector gear being meshed with a tape loading mechanism for loading and unloading the tape around the recorder head, said inner position of said groove corresponding to a position of said tape loading mechanism in which the tape is fully unloaded from the recorder head;

a pivotable reversing lever having one end pivotally mounted to the chassis about a pivot axis and another end engageable with said one end of said sector gear (34) such that said reversing lever is shifted between a first position and a second position when said one end of said sector gear is slidably moved between said outer position and said inner position of said groove, respectively, by rotation of said positive motion cam, said reversing lever being shifted to said second position only when said one end of said sector gear has moved substantially completely to said inner position of said groove;

a pivotable arm (42) having one end pivotally mounted to the chassis, a pinion (43) supported at an intermediate portion thereof and being driven in forward and reverse rotation of the reversible motor for moving the cassette to the loading position and loading the tape, and for unloading the tape and ejecting the cassette, respectively, and a fore end connected by a bistable spring arranged to a part of said reversing lever for positively switching said pinion when said reversing lever is shifted by said sector gear from said first position to said second position, between a position in mesh with said positive motion cam and a position in mesh with said rotatable cassette moving gear, said pinion being spaced apart from said cassette moving gear when it is in mesh with said positive motion cam, and spaced apart from said positive motion cam when it is engaged with said cassette moving gear, wherein said bistable spring arrangement comprises a torsion coil spring having two ends each mounted on a respective support point on said fore end of said pivotable arm and on said part of said reversing lever such that a line passing between the pivot axis of said reversible lever and the support point thereof is moved to one side and then the other relative to the support point on the pivotable arm when said reversing lever is shifted between said first and second positions, whereby said pinion is positively switched to mesh sequentially with said tape loading mechanism and then with said cassette moving mechanism by rotation of said single reversible motor in one direction.

* * * * *